(12) United States Patent
Barnett

(10) Patent No.: US 8,225,589 B2
(45) Date of Patent: Jul. 24, 2012

(54) DRIVE ARRANGEMENT FOR A MOWER WITH ROTARY CUTTER DISKS

(75) Inventor: Neil Gordon Barnett, Winnipeg (CA)

(73) Assignee: MacDon Industries Ltd, Winnipeg, MB (CA)

( * ) Notice: Subject to any disclaimer, the term of this patent is extended or adjusted under 35 U.S.C. 154(b) by 0 days.

(21) Appl. No.: 12/849,279

(22) Filed: Aug. 3, 2010

(65) Prior Publication Data

US 2012/0031064 A1    Feb. 9, 2012

(51) Int. Cl.
*A01D 43/00* (2006.01)
(52) U.S. Cl. .......................... 56/157; 56/13.6
(58) Field of Classification Search .................. 56/157, 56/6, 7, 13.6, 192
See application file for complete search history.

(56) References Cited

U.S. PATENT DOCUMENTS

| | | | | |
|---|---|---|---|---|
| 4,253,294 A | * | 3/1981 | Zweegers | 56/13.6 |
| 4,771,591 A | * | 9/1988 | Ermacora | 56/13.6 |
| 4,848,069 A | | 7/1989 | Ermacora | |
| 4,860,527 A | * | 8/1989 | Maarten | 56/13.6 |
| 4,899,523 A | * | 2/1990 | Frumholtz et al. | 56/155 |
| 5,094,063 A | * | 3/1992 | Wattron et al. | 56/6 |
| 5,179,822 A | | 1/1993 | McLean | |
| 5,357,737 A | * | 10/1994 | Ermacora et al. | 56/16.4 R |
| 5,463,852 A | | 11/1995 | OHalloran | |
| 5,507,136 A | * | 4/1996 | Walch | 56/6 |
| 6,035,619 A | * | 3/2000 | Loehr | 56/13.6 |
| 6,318,055 B1 | * | 11/2001 | Bird | 56/6 |
| 6,718,744 B2 | * | 4/2004 | Rosenbalm et al. | 56/6 |
| 2008/0066439 A1 | | 3/2008 | Barnett | |
| 2008/0066440 A1 | | 3/2008 | Barnett | |
| 2008/0066441 A1 | | 3/2008 | Barnett | |
| 2009/0071116 A1 | | 3/2009 | Barnett | |

FOREIGN PATENT DOCUMENTS

| | | |
|---|---|---|
| CA | 2559217 | 3/2008 |
| CA | 2559353 | 3/2008 |
| CA | 2578907 | 8/2008 |
| CA | 2639032 | 3/2009 |

* cited by examiner

*Primary Examiner* — Arpad Fabian-Kovacs
(74) *Attorney, Agent, or Firm* — Adrian D. Battison; Ade & Company Inc

(57) ABSTRACT

A crop harvesting header includes a cutter bar mounted on a frame carrying a plurality of generally horizontal cutter disks. The cutter bar includes a first longitudinally extending hollow gear case and a second longitudinally extending hollow gear case divided at a position along the length of the cutter bar so as to form first and second separate sections. Each gear case includes a gear train of spur gears to drive the cutter disks. On each section the outermost disk is connected to an upstanding drive shaft with a right angle gear box connected to an upper end with a drive transfer shaft connecting the first and second gear boxes, an input hydraulic drive motor to the first gear box and an output shaft and the second gear box for driving the conditioner.

15 Claims, 8 Drawing Sheets

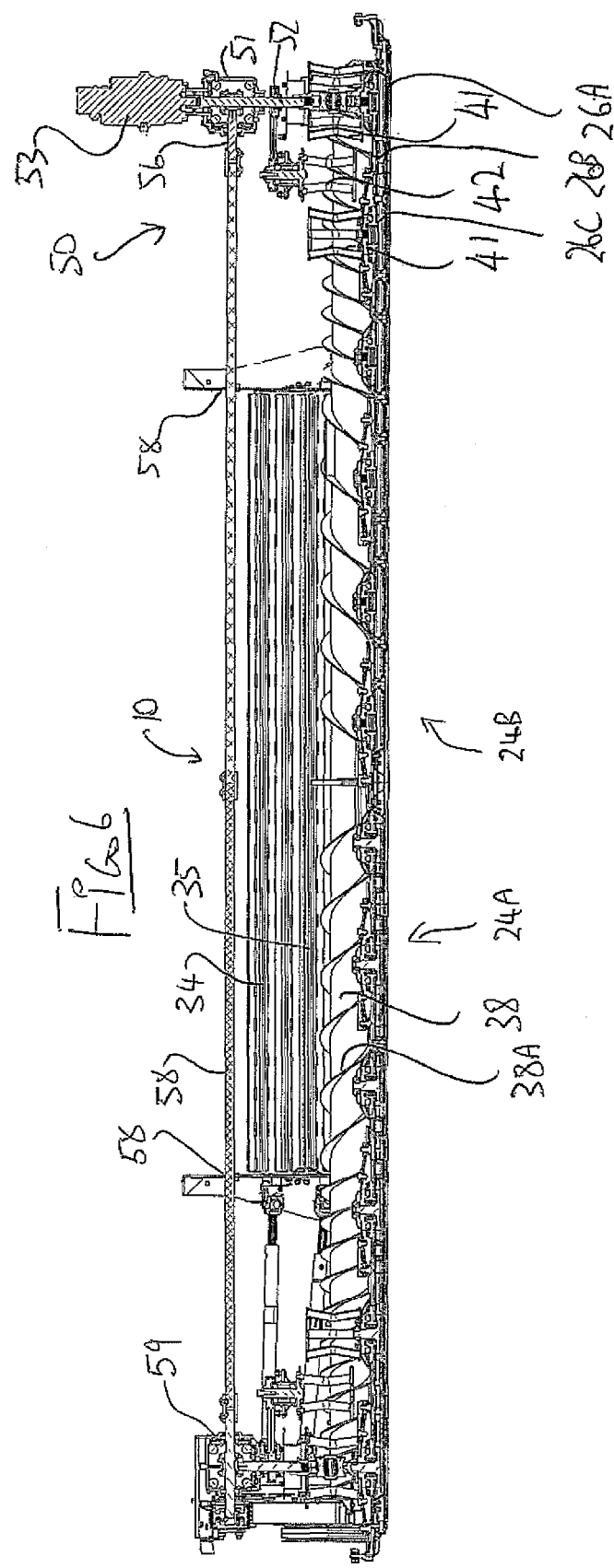

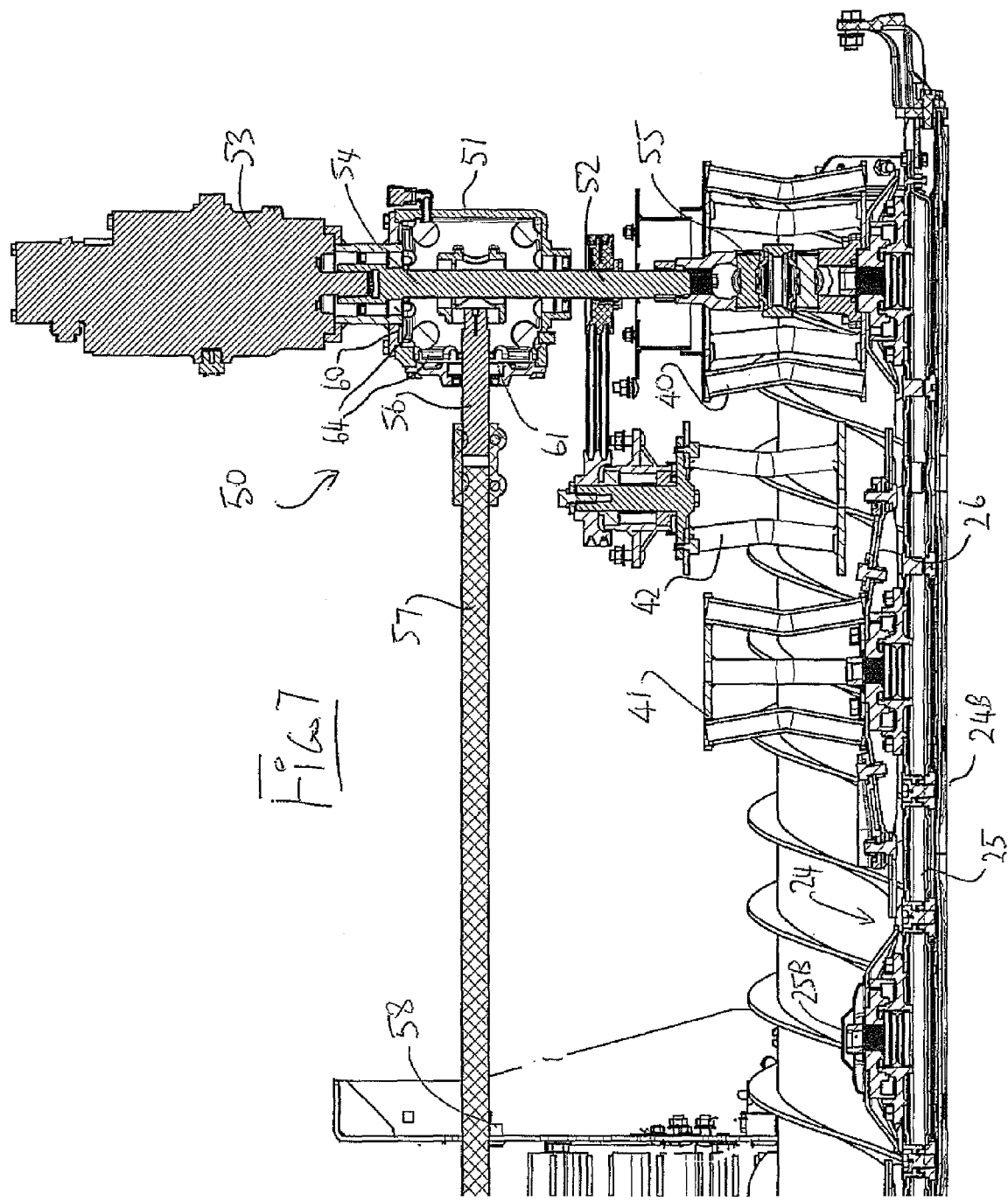

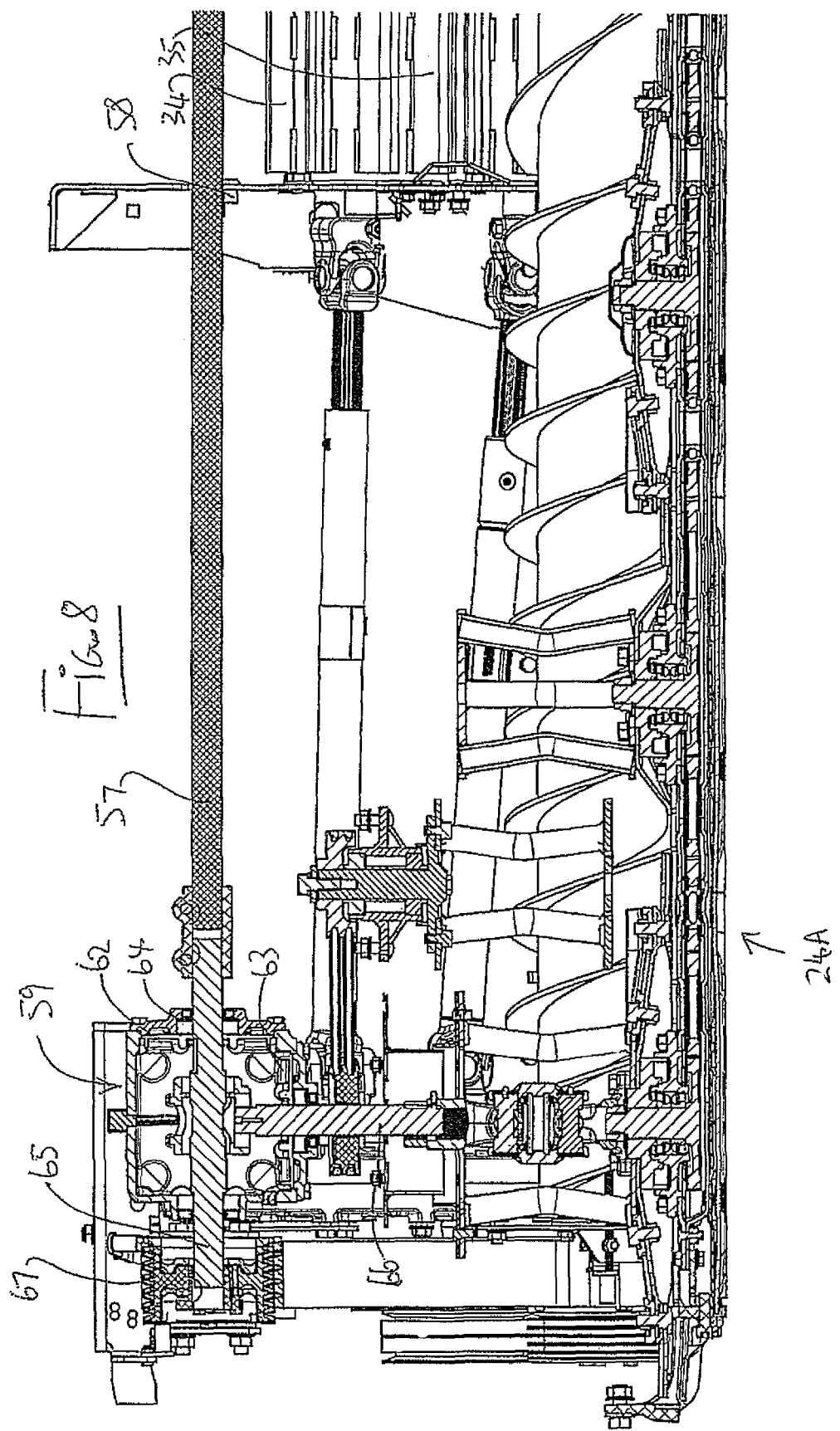

DRIVE ARRANGEMENT FOR A MOWER WITH ROTARY CUTTER DISKS

This invention relates to a crop harvesting header which has a cutter bar which carries and drives a plurality of transversely spaced rotary disks and particularly to a drive arrangement for the header.

This application relates to the subject matter disclosed in the following documents:

US Published Application 2009/0071116 filed Jul. 23, 2008 and published Mar. 19, 2009 which corresponds to Canadian application 2,639,032 and entitled CROP HARVESTING HEADER WITH ROTARY DISKS AND IMPELLERS FOR TRANSFERRING THE CROP INWARDLY TO A DISCHARGE OPENING;

US Published Application 2008/0066440 filed Sep. 15, 2006 and published Mar. 23, 2008 which corresponds to Canadian application 2,559,353 and entitled CROP HARVESTING HEADER WITH ROTARY DISKS AND IMPELLERS FOR TRANSFERRING THE CROP INWARDLY TO A DISCHARGE OPENING;

US Published Application 2008/0066441 filed Sep. 15, 2006 and published Mar. 23, 2008 which corresponds to Canadian application 2,559,217 and entitled CROP HARVESTING HEADER WITH ROTARY DISKS AND A TRANSFER ROLLER CARRYING THE CUT CROP TO THE NIP OF A PAIR OF CONDITIONING ROLLS;

US Published Application 200810066439 filed Feb. 15, 2007 and published Mar. 23, 2008 which corresponds to Canadian application 2,578,907 and entitled CROP HARVESTING HEADER WITH ROTARY DISKS AND IMPELLERS FOR TRANSFERRING THE CROP INWARDLY TO A DISCHARGE OPENING.

Reference is also made to co-pending application Ser. No. 12/817267 filed Jun. 17th 2010 and entitled CROP HARVESTING HEADER WITH ROTARY DISKS AND AUGER FOR TRANSFERRING THE CROP TO A DISCHARGE OPENING claiming priority from Provisional Application 61/223,967 filed Jul. 8th 2009.

The disclosures of the above applications are incorporated herein by reference or the disclosures may be referred to by the reader for further detail of the subject matter disclosed herein.

BACKGROUND OF THE INVENTION

U.S. Pat. No. 4,899,523 issued February 1990 (Frumholtz) assigned to Kuhn discloses a mower including two groups of cutter disks, where the groups are separated at the center with each group including drive elements from each disk to the next. Drive is communicated to the two groups from an input drive shaft from the tractor to the center of the mower with a pair of outwardly extending drive shafts each extending to a vertical input shaft at the end cutter disk.

U.S. Pat. No. 4,253,294 (Zweegers) issued Mar. 3, 1981 discloses a mowing machine has a plurality of cutting disks rotatably supported on a cutter bar beneath the cutting disks. The cutting disks are driven by a horizontal drive shaft extending above the cutting disks coupled to a tractor power take-off shaft. The drive shaft is directly coupled through respective gear boxes with vertical shafts upon which are mounted the two outermost cutting disks. Drive between the disks is effected by a shaft extending along the cutter bar.

U.S. Pat. No. 4,848,069 (Ermacora) issued Jul. 18, 1989 and assigned to Kuhn discloses a mower which comprises two groups of cutting disks each mounted on a cutting bar where the cutting bars are connected to one another by a joint and are connected to the frame by a suspension.

U.S. Pat. No. 4,860,527 Maarten Koorn issued Aug. 29, 1989 and assigned to Van Der Lely discloses a mowing machine comprising at least three cutter disks on a supporting cutter bar. A rotating torsion shaft which is driven at both ends by drive shafts from a center power input is mounted in the cutter bar and carries gears for driving the disks.

U.S. Pat. No. 5,179,822 (McLean) issued Jan. 19, 1993 and assigned to Ford New Holland discloses a mower conditioner which includes a cutter bar defined by two sections separated at the center carried by a header that is suspended from a frame. The cutter bar has a plurality of individual cutting disks with two end cutting disks located adjacent opposed sides of the frame and intermediate cutting disks disposed between the end cutting disks. Input drive shafts deliver power from a power-take-off shaft on the tractor to a pair of generally vertical output drive shafts, via a bevel gearbox and a spur gearbox, connected to two of the intermediate cutting disks. The intermediate disks drive the remaining disks of that section by a shaft along the cutter bar.

U.S. Pat. No. 5,463,852 reissued as RE 40611 (O'Halloran) issued Nov. 7, 1995 to Hay and Forage (AGCO) discloses a harvester which has a series of rotary cutter disks on a cutter bar extending across the path of travel of the machine and rotatable about individual upright axes. The cutter bar is a flat gear case containing a train of intermeshed spur gears that serve to distribute power between the disks. Each end of the cutter bar has a hollow, gearless extension welded thereto which supports at least one additional outboard cutter disk that receives its driving power exteriorly of the cutter bar. One embodiment uses a mechanical drive to bring power to the upright shaft of the cutter disk having the first spur gear so that the cutter disks with gears receive all their power from the driven cutter. The outboard cutters not having gears are driven by an exterior, over-the-top drive mechanism. As an alternative to a mechanical drive, the cutter bar may utilize a pair of hydraulic motors coupled with the shafts of the first and last disks. All of the gears in the gear case remain positively enmeshed with one another in the gear train, so that the two hydraulic motors share the total load of driving the cutter bed.

SUMMARY OF THE INVENTION

It is one object of the invention to provide a crop harvesting header of the above general type including a novel arrangement of drive to the cutter disks.

According to a first aspect of the present invention there is provided a crop harvesting header comprising:

a header frame arranged to be transported across ground on which there is a standing crop for harvesting;

a cutter bar mounted on the header frame across a width of the header for movement across the ground for harvesting the standing crop;

a plurality of generally horizontal cutter disks mounted on the cutter bar at positions spaced transversely of the header with the disks being mounted on the cutter bar for driven rotation about respective generally upright axes spaced along the cutter bar;

each disk having mounted thereon at a position spaced outwardly from the respective axis thereof at least one cutter blade such that rotation of the disk about its axis causes a standing crop to be cut by the blade as it rotates around the axis on the disk;

the cutter bar including a first longitudinally extending hollow gear case and a second longitudinally extending hollow gear case divided at a position along the length of the cutter bar so as to form first and second separate sections;

the first gear case including a first gear train formed by a series of intermeshing gears arranged to drive the cutter disks of the first section;

the second gear case including a second gear train separate from the first gear train formed by a series of intermeshing gears arranged to drive the cutter disks of the second section;

one of the cutter disks of the first section having a first upstanding drive shaft through which drive is connected to the gear train of the first section;

one of the cutter disks of the second section having a second upstanding drive shaft through which drive is connected to the gear train of the second section;

a first gear box connected to an upper end of the first drive shaft;

a second gear box connected to an upper end of the second drive shaft;

a drive transfer shaft connecting the first and second gear boxes;

and an input drive for supplying driving rotation to at least the first of the first and second gear boxes.

The term "frame" used herein is not intended to be limited to any particular shape or position of the components concerned but can include any part of the structure which provides support for elements of the header thereon.

Preferably the gear train formed by a series of intermeshing spur gears.

Preferably the input drive provides drive at the first gear box only.

Preferably the input drive is a hydraulic motor.

Preferably the first gear box is a right angle drive gear box with bevel gears.

Preferably there is provide a conditioner assembly and wherein the second gear box has an output shaft providing an output drive to the conditioner assembly.

Preferably the second gear box is a right angle drive gear box with bevel gears.

Preferably the output shaft is directly driven by the drive transfer shaft and the second drive shaft is at right angles to the transfer shaft and driven by a bevel gear from the drive transfer shaft.

Preferably the drive transfer shaft is driven at a rate of rotation slower than the first and second drive shafts.

Preferably the drive transfer shaft is driven at a rate of rotation slower than the first and second drive shafts.

According to a second aspect of the present invention there is provided a crop harvesting header comprising:

a header frame arranged to be transported across ground on which there is a standing crop for harvesting;

a cutter bar mounted on the header frame across a width of the header for movement across the ground for harvesting the standing crop;

a plurality of generally horizontal cutter disks mounted on the cutter bar at positions spaced transversely of the header with the disks being mounted on the cutter bar for driven rotation about respective generally upright axes spaced along the cutter bar;

each disk having mounted thereon at a position spaced outwardly from the respective axis thereof at least one cutter blade such that rotation of the disk about its axis causes a standing crop to be cut by the blade as it rotates around the axis on the disk;

the cutter bar including a first longitudinally extending hollow gear case and a second longitudinally extending hollow gear case divided at a position along the length of the cutter bar so as to form first and second separate sections;

the first gear case including a first drive train arranged to drive the cutter disks of the first section;

the second gear case including a second drive train arranged to drive the cutter disks of the second section;

one of the cutter disks of the first section having a first upstanding drive shaft through which drive is connected to the drive train of the first section; one of the cutter disks of the second section having a second upstanding drive shaft through which drive is connected to the drive train of the second section;

a first gear box connected to an upper end of the first drive shaft;

a second gear box connected to an upper end of the second drive shaft;

a drive transfer shaft connecting the first and second gear boxes;

a conditioner assembly for receiving crop from the cutter disks;

and an input drive for supplying driving rotation to at least the first of the first and second gear boxes;

wherein the second gear box has an output shaft providing an output drive to the conditioner assembly.

According to a third aspect of the present invention there is provided a crop harvesting header comprising:

a header frame arranged to be transported across ground on which there is a standing crop for harvesting;

a cutter bar mounted on the header frame across a width of the header for movement across the ground for harvesting the standing crop;

a plurality of generally horizontal cutter disks mounted on the cutter bar at positions spaced transversely of the header with the disks being mounted on the cutter bar for driven rotation about respective generally upright axes spaced along the cutter bar;

each disk having mounted thereon at a position spaced outwardly from the respective axis thereof at least one cutter blade such that rotation of the disk about its axis causes a standing crop to be cut by the blade as it rotates around the axis on the disk;

the cutter bar including a first longitudinally extending hollow gear case and a second longitudinally extending hollow gear case divided at a position along the length of the cutter bar so as to form first and second separate sections;

the first gear case including a first drive train arranged to drive the cutter disks of the first section;

the second gear case including a second drive train arranged to drive the cutter disks of the second section;

one of the cutter disks of the first section having a first upstanding drive shaft through which drive is connected to the drive train of the first section;

one of the cutter disks of the second section having a second upstanding drive shaft through which drive is connected to the drive train of the second section;

a first right angle gear box with bevel gears, one of which is connected to an upper end of the first drive shaft;

a second gear box with bevel gears, one of which is connected to an upper end of the second drive shaft;

a drive transfer shaft connecting the first and second gear boxes;

and an input drive for supplying driving rotation to at least the first of the first and second gear boxes.

The design as described in more detail hereinafter consists of two sections of cutter bar separated at the center and two bevel gear boxes. A right angle gear box is positioned above a drive spindle on one cutter bar. A hydraulic motor drives an input shaft on the gear box, which runs straight through and drives the spindle on the cutter bar via a universal joint drive line. The side output of the gear box drives, via a fixed cross shaft on bearings, the input of the second bevel gear box. This secondary output is at a lower speed than the input speed. This input shaft goes straight through the box and the output is used to drive the conditioner. The 90 degree output of the second gear box drives a drive spindle of the second cutter bar at the same speed as is input to the first cutter bar. This design also provides power output to the conditioner. The drive to the conditioner can be further divided to a conveying mechanism and the conditioner. The conditioner can be a pair of intermeshing conditioner rollers or can be of the flail type. The drive spindles of the bevel gear boxes used to drive the end disks of the cutter bar are surrounded by a cage impeller arrangement and a second impeller can be mounted on the second disk. An endless belt drive can also used to drive a suspended impeller between the impeller of the last disk and the next impeller.

This design allows the use of a wider cutter bar which must be divided into separate sections and yet provides the opportunity to have a single, unobstructed, centered delivery of crop through the header to a centered condition assembly. This design only requires two gear boxes to distribute power to the cutter bar and conditioner whereas other designs typically require three. Each gear box only has one through shaft and one side output shaft thus requiring only four bearings. This design allows the machine to be hydraulically driven. This design also allows for using a two piece cutter bar.

The cutter bar may be formed a single piece driven from one end or may be formed in two or more sections.

Where impellers are used, these are typically of the type shown in previously mentioned U.S. Pat. No. 7,340,876 issued Mar. 11, 2008 which corresponds to US Published Application 2008/0066440 filed Sep. 15, 2006 and published Mar. 23, 2008 and to Canadian application 2,559,353 of an hour glass shape. Such impellers are commonly of the type using angularly spaced bars but can also be of the type which are formed by solid drums which may or may not have external crop engaging element s formed on the outside surface of the drum.

The conditioner defined herein may be or the type using a pair of fluted rollers defining a nip. However other types of conditioner can also be used. Also in some cases the header can be used without a conditioner so that the crop material is deposited directly onto the ground or collected,

BRIEF DESCRIPTION OF THE DRAWINGS

FIG. 6 is a vertical cross sectional view of the complete header of FIG. 1.

FIG. 7 is a partial vertical cross sectional view of the header of FIG. 1 showing one end.

FIG. 8 is a partial vertical cross sectional view of the header of FIG. 1 showing the other end.

In the drawings like characters of reference indicate corresponding parts in the different figures.

DETAILED DESCRIPTION

Figure 1:
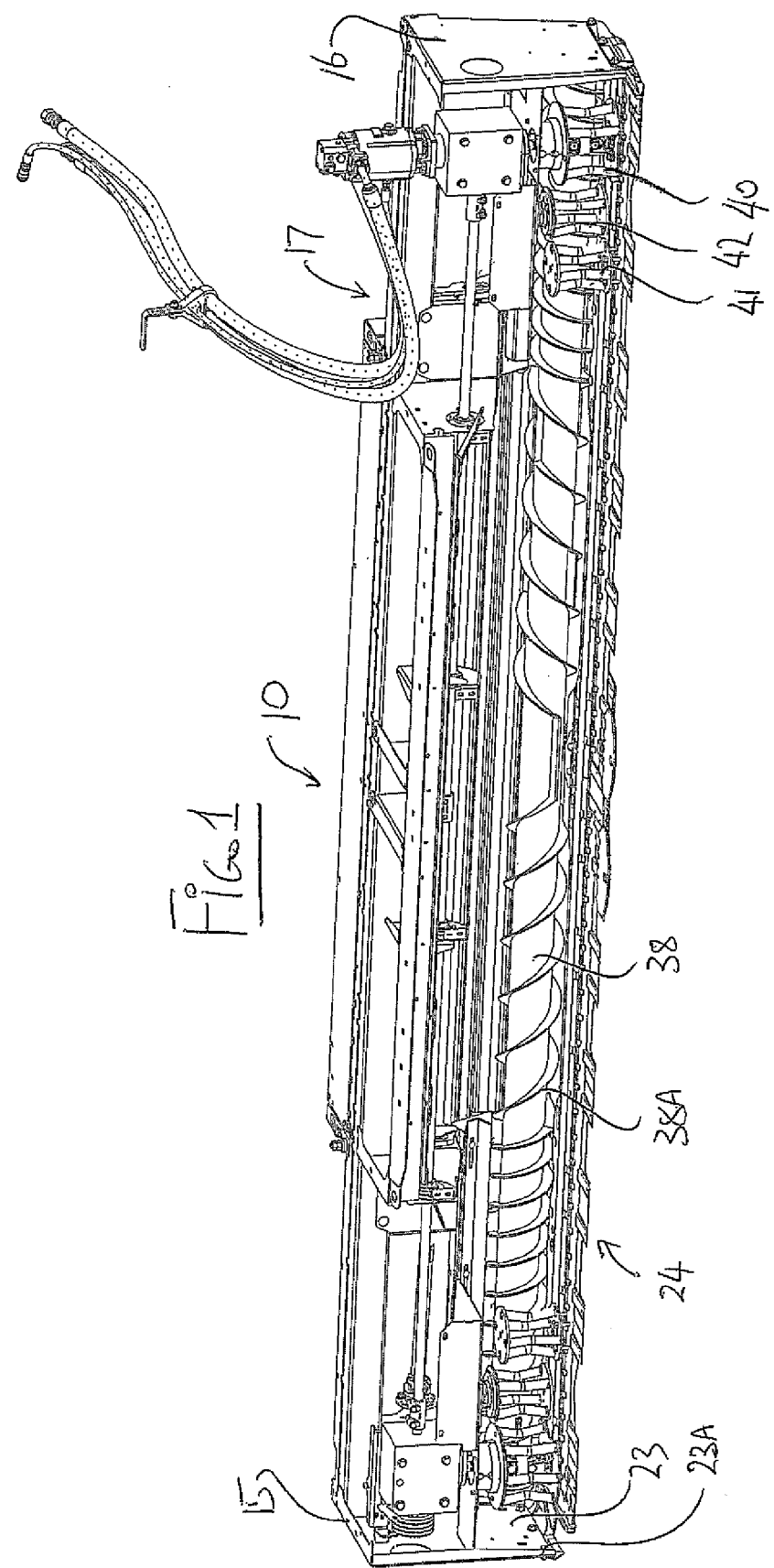
FIG. 1 is an isometric view from the front and one side of a header according to the present invention.

In FIG. 1 is shown a header 10 for attachment to conventional swather tractor of the well known type having driven ground wheels and rear castor wheels. A front support assembly of the tractor carries the header including left and right lift arms which carry the header in a floating action across the ground along skid plates (not shown) of the header. The header includes side walls 15 and 16 forming part of a frame 17 attached to the lift system of the tractor. The frame carries top covers 18 which support a front skirt 19 in front of the cutter bar.

The frame 17 includes a main transverse beam 13 which is attached to the tractor. The main beam carries the side walls 15 and 16. The side walls each comprises a vertical wall extending forwardly to a front edge 23 in front of a cutter bar 24. The side wall is vertical and the front edge 23 lies in a vertical plane of the side wall so as to confine crop material to the interior of the header between the side walls for cutting action effected by the cutter bar 24.

Within the cutter bar 24 is provided a gear train 25 of meshing spur gears 25A, shown in Figures, 6, 7 and 8 and best visible in FIG. 8, carried on suitable bearings so as to provide communication of drive of a number of vertical shafts 25B carried on the cutter bar each for rotating a generally horizontal disk 26 about a vertical axis of the shaft. The disks are substantially identical. The disks are generally elliptical in shape so that a length between two ends is significantly greater than a distance between the side edges in a direction at right angles to the length. At each of the ends is mounted a respective one of a pair of flail blades 27 each for pivotal movement about a flail mounting pin at the edge of the disk. The mounting pins are arranged at the ends and thus at the maximum extent of the disk so that the flails project outwardly beyond the edges of the disk for rotation in a common horizontal cutting plane generally parallel to the plane of the cutter bar in a cutting action.

The disks are intermeshed so as to driven synchronously and they are arranged at 90° phase difference so that adjacent pairs of the disks are at 90° offset as they rotate to avoid interference between the disks and the blades 27 carried thereby.

Figure 2:
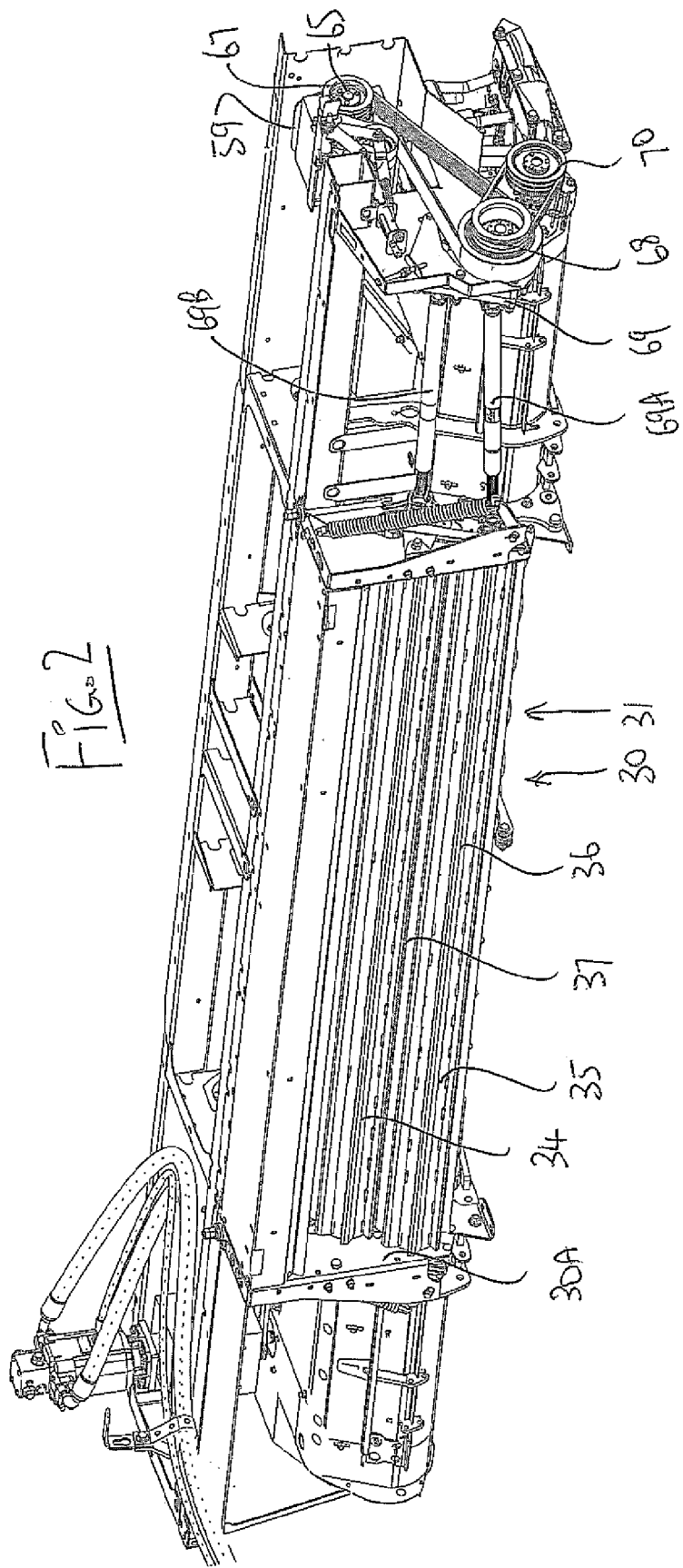
FIG. 2 is an isometric view of the header of FIG. 1 from the rear and the other side.
Figure 3:
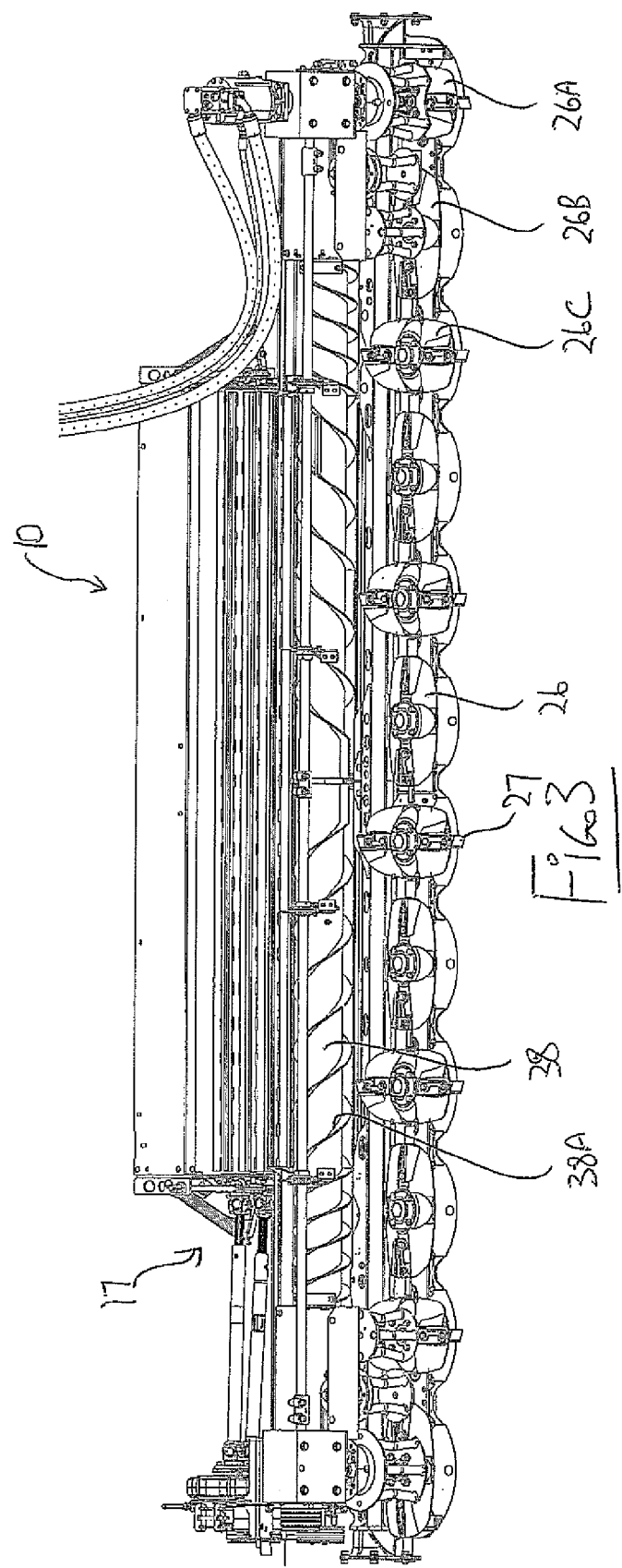
FIG. 3 is a schematic front elevational view of the header of FIG. 1.
Figure 4:
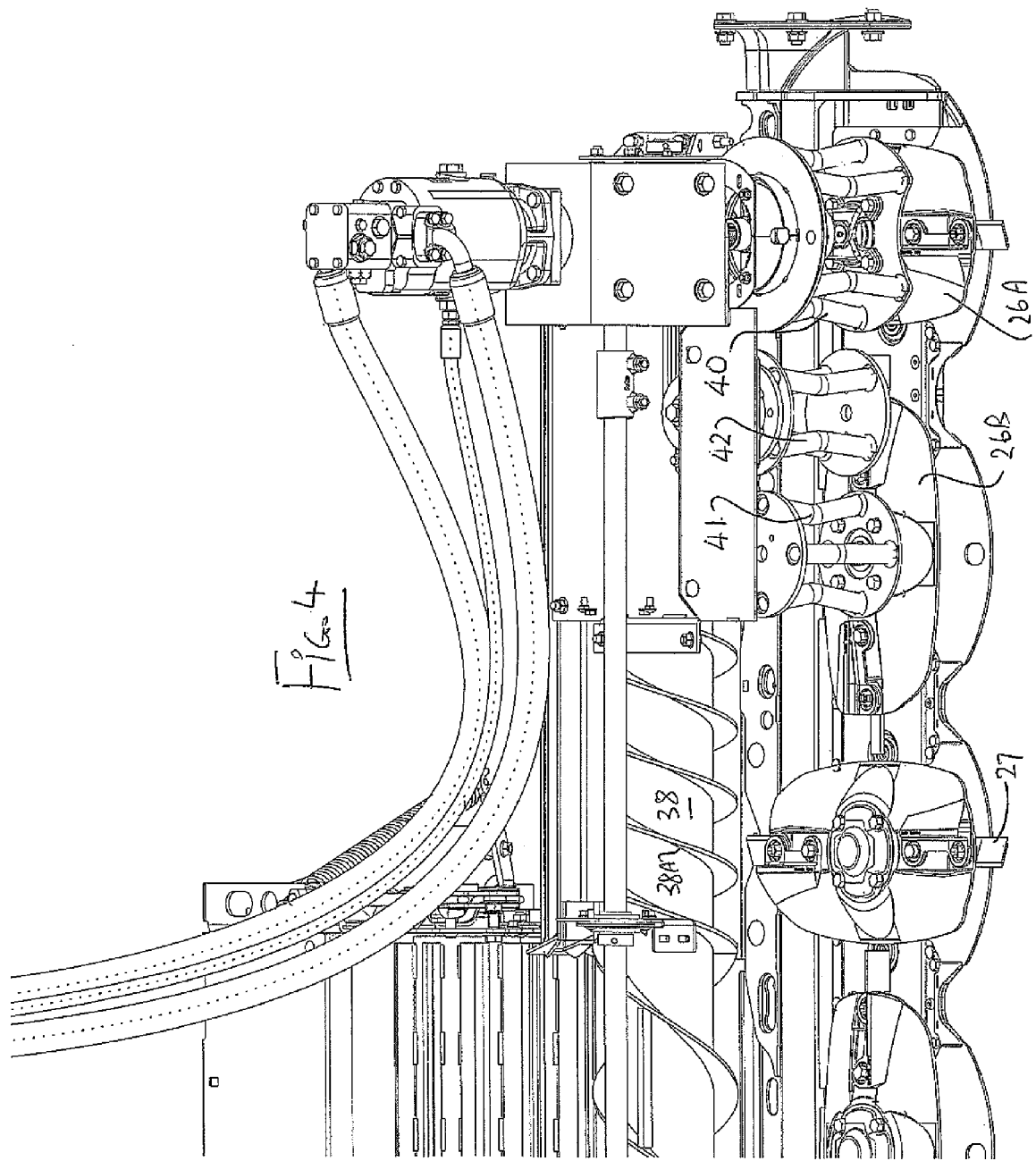
FIG. 4 is a front elevational view of one end of the header of FIG. 3 on an enlarged scale.
Figure 5:
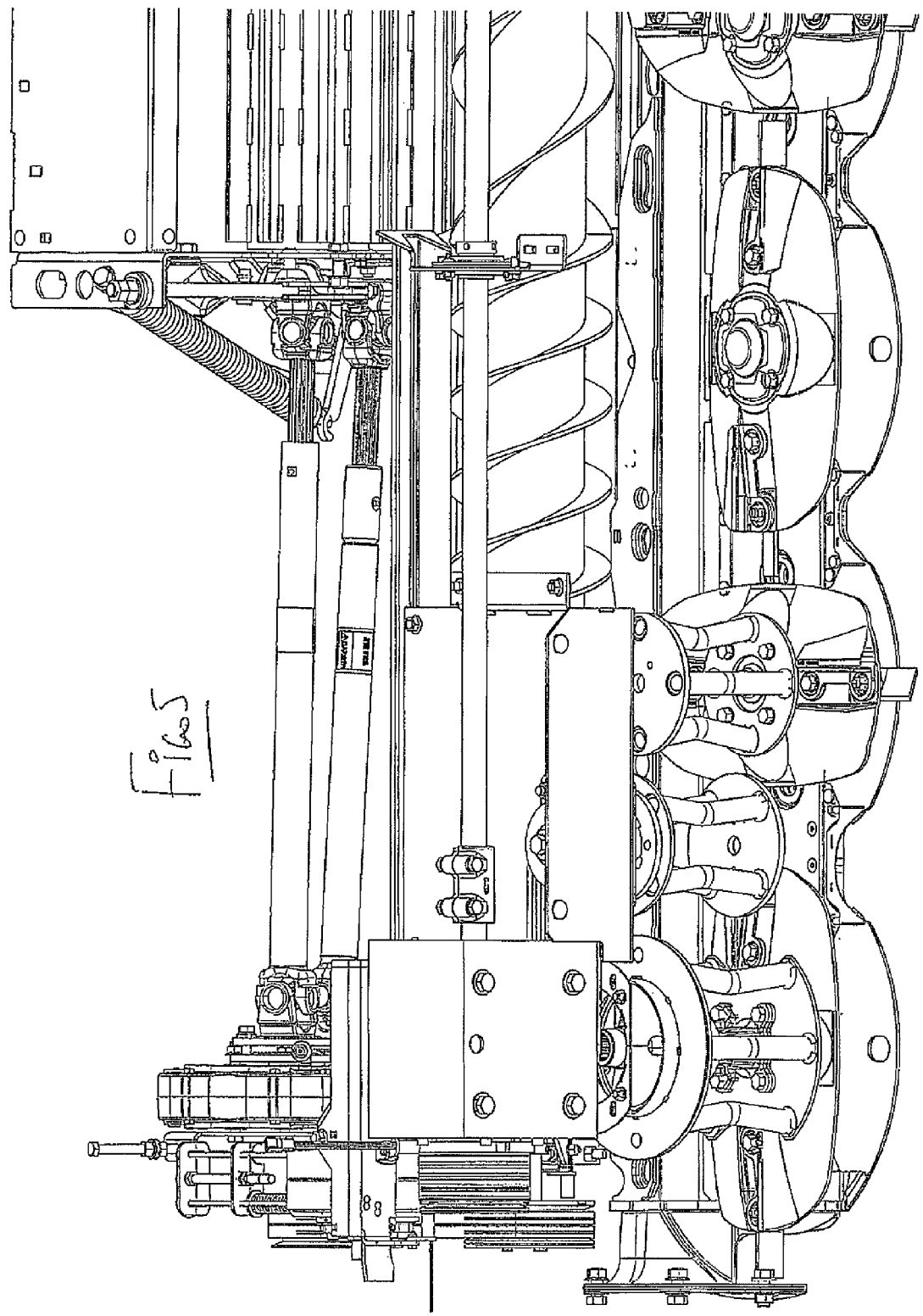
FIG. 5 is a front elevational view of the other end of the header of FIG. 3 on an enlarged scale.

As shown in FIG. 2, the cutter bar 24 is wider than a discharge opening 30 with a conditioning system 31 mounted in the discharge opening 30. Thus the crop material passes over and between the disks when cut and also must be converged from the full cut width into the discharge opening 30. The discharge opening is defined by side walls 30A and 30B which are parallel to the direction of travel of the header.

The cutter bar of this general construction is of a conventional nature and many examples of a commercial arrangement of this type are available in the market place. Thus the details of the cutter bar and its mounting are well known to one skilled in the art and further details can be obtained from such commercial devices.

In this construction shown in FIGS. 6, 7 and 8 the cutter bar 24 as shown in FIG. 6 is split into two separate sections 24A and 24B where there is no connection between the gears of one section and the gears of the next. This construction allows a greater degree of flex of the cutter bar at the center. Thus the cutter bar can be of greater length than would otherwise be possible with the same construction and structural stiffness since some of the necessary flexing action can be accommodated at the center junction where there are no spur gears, thus reducing the amount of flexing necessary at other locations along the length where the spur gears cannot accommodate that level of flexing. The cutter bar includes a hollow gear case which contains the spur gears which is carried on a beam so that the beam and the gear case cooperate to form a structural member supporting the cutter bar across the header. As shown there are twelve disks so that when separated at the center each section of the gear case carries six disks. However as disclosed in the above applications incorporated herein by reference machines of ten and twelve disks can be manufactured so that a machine with ten disks would have five on each gear case.

The discharge opening 30 has two side walls 30A and 30B which confine the crop material to pass through the discharge opening over a width less than the width of the header so that the side walls are spaced inwardly from the respective end walls 15 and 16 of the header. The crop conditioning system 31 is arranged to span the width of the crop discharge opening so that the width of the conditioning system is equal to the width of the discharge opening. The conditioning system comprises a top roller 34 and a bottom roller 35 which have flutes 36 arranged in a meshing arrangement so that the crop material passing through the discharge opening passes through a nip 37 between the conditioning rolls and is discharged from the rear of the conditioning system as a swath of material to be discharged onto the ground or to be collected as required.

The disks 26 mounted on the cutter bar 24 include a series of disks which are located in front of the discharge opening 30. Outward of these disks on end is provided a pair of outer disks indicated at 26A and 26B with the disk 26A outermost. These disks are arranged to rotate inwardly so that the front extremity and the blade carried thereby rotates in the direction indicated at the arrows D as shown in FIG. 1 to carry the crop material which is cut by those disks inwardly toward the discharge opening.

Each of the disks 26A and 26B carries a respective one of a plurality of impellers. Thus the disk 26A carries an upstanding impeller 40 and the disk 26B carries an impeller 41. In between these two impellers is mounted a third suspended impeller 42.

Thus in the embodiment shown there are three impellers arranged to engage the crop material during or slightly after the cutting action so as to carry the crop material inwardly toward the end wall of the discharge opening. The number of impellers can be increased or decreased depending upon particular requirements or particular designs. Thus there may be only two impellers or there maybe more impellers. The impellers 40 and 41 are mounted on the respective disk so as to be carried thereby and driven thereby. The impeller 42 is carried on the frame 17 at a position above the cutter bar 24 so as to be a hanging impeller supported from a mounting system 44 above the impeller wherein there is provided a suitable bearing and also a suitable drive system within a frame member of the frame 17.

The top conditioning roller 34 is located above the bottom conditioning roller 35. These define between them the nip 37 through which the crop material is controlled to pass. In order to assist the crop material from the cutting disks to flow to the nip 37, there is provided a crop transfer roller 38 which is located in the area between the rear of the disks and the nip of the conditioning roller system. In this embodiment the transfer roller 38 extends substantially across the full width of the header and carries an auger flight 38A which acts to engage the crop behind the cutting disks and to carry that crop inwardly to the discharge opening for feeding to the conditioning rollers.

The drive system for the header is shown schematically in FIGS. 6, 7 and 8 and is indicated generally at 50. A right angle gear box 51 is positioned above a drive spindle 52 on one section 24B of the cutter bar 24. A hydraulic motor 53 drives an input shaft 54 on the gear box 51, which runs straight through and drives the spindle 52 on the cutter bar via a universal joint drive line 55. The side output 56 of the gear box 51 drives, via a fixed cross shaft 57 on bearings 58, the input of a second bevel gear box 59 symmetrical to the first. Each gear box 51 and 59 includes two bevel gears 60, 61 and 62, 63 at right angles each carried on bearing 64.

This side output from gear 61 to the shaft 57 is at a lower speed than the input speed at the shaft 54. This shaft 57 goes straight through the box 59 to an output shaft 65 while driving the bevel gear 62. The 90 degree output of the second gear box at the bevel gear 63 drives a drive spindle 66 of the second section 24A of the cutter bar 24 at the same speed as the input on the shaft 54 and the spindle 52 to the first cutter bar section 24B.

This design also provides power output to the top and bottom rollers 34, 35 of the conditioner 31 and to the transfer roller 37. Thus the shaft 65 carries pulley 67 which provides an output drive to a pulley 68 which supplies drive to a gear box 69 (FIG. 2) driving the top and bottom rollers through shafts 69A and 69B and driving the transfer roller 38 through a pulley 70 driven from the pulley 68.

An endless belt drive 70 including a first pulley 71 on the spindle 66 and a second pulley 72 can also used to drive the suspended impeller 42 between the impeller 40 of the last disk and the next impeller 41.

Thus the end cutter disk 26X of the first section 24B has a first upstanding drive shaft 52 through which drive is connected to the gear train of the first section 24B. Symmetrically the end one 26A of the cutter disks of the second section 24A has a second upstanding drive shaft 66 through which drive is connected to the gear train of the second section. The first gear box 51 is connected to an upper end of the first drive shaft 52 and the second gear box 59 is connected to an upper end of the second drive shaft 66. The drive transfer shaft 57 connects the first and second gear boxes and transfers drive from the first gear box to the second. The hydraulic motor 53 acts as an input drive for supplying driving rotation to the first gear box.

In the preferred arrangement, there is a single hydraulic motor so that the input drive provides drive at the first gear box only. However another arrangement (not shown) can include a second hydraulic motor at the gear box 59 so as to provide a second balanced input. The drive transfer shaft connects the two gear boxes so that they remain in synchronism while the load is shared by the two motors. The gear box 59 in this arrangement is therefore more complex and includes three bevels and six bearings.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:
1. A crop harvesting header comprising:
a header frame arranged to be transported across ground on which there is a standing crop for harvesting;
a cutter bar mounted on the header frame across a width of the header for movement across the ground for harvesting the standing crop;
a plurality of generally horizontal cutter disks mounted on the cutter bar at positions spaced transversely of the header with the disks being mounted on the cutter bar for driven rotation about respective generally upright axes spaced along the cutter bar;
each disk having mounted thereon at a position spaced outwardly from the respective axis thereof at least one cutter blade such that rotation of the disk about its axis causes a standing crop to be cut by the blade as it rotates around the axis on the disk;

the cutter bar including a first longitudinally extending hollow gear case underneath a first plurality of the cutter disks and a second longitudinally extending hollow gear case underneath a second plurality of the cutter disks;

each of the first plurality of disks and the second plurality of disks containing at least five disks;

the first hollow gear case extending from a first end of the cutter bar to a position part way along the cutter bar and containing therein a first gear train formed by a series of intermeshing gears underneath the first plurality of disks and arranged to drive the first plurality of cutter disks;

the second hollow gear case extending from a second end of the cutter bar to said position part way along the cutter bar and containing therein a second gear train formed by a series of intermeshing gears underneath the second plurality of disks and arranged to drive the cutter disks;

the intermeshing gears of the first hollow gear case being separated from the intermeshing gears of the second hollow gear case so that the first gear train drives the first plurality of disks and the second gear train separately drives the second plurality of disks;

one of the cutter disks of the first plurality of cutter disks having a first upstanding drive shaft through which drive is connected to the first gear train;

one of the cutter disks of the second plurality of cutter disks having a second upstanding drive shaft through which drive is connected to the second gear train;

a first gear box connected to an upper end of the first drive shaft;

a second gear box connected to an upper end of the second drive shaft;

a drive transfer shaft connecting the first and second gear boxes;

and an input drive for supplying driving rotation to at least the first of the first and second gear boxes.

2. The header according to claim 1 wherein the input drive provides drive at the first gear box only.

3. The header according to claim 1 wherein the input drive is a hydraulic motor.

4. The header according to claim 1 wherein the drive transfer shaft is driven at a rate of rotation slower than the first and second drive shafts.

5. A crop harvesting header comprising:
a header frame arranged to be transported across ground on which there is a standing crop for harvesting;
a cutter bar mounted on the header frame across a width of the header for movement across the ground for harvesting the standing crop;
a plurality of generally horizontal cutter disks mounted on the cutter bar at positions spaced transversely of the header with the disks being mounted on the cutter bar for driven rotation about respective generally upright axes spaced along the cutter bar;
each disk having mounted thereon at a position spaced outwardly from the respective axis thereof at least one cutter blade such that rotation of the disk about its axis causes a standing crop to be cut by the blade as it rotates around the axis on the disk;
the cutter bar including a first longitudinally extending hollow gear case underneath a first plurality of the cutter disks and a second longitudinally extending hollow gear case underneath a second plurality of the cutter disks;
each of the first plurality of disks and the second plurality of disks containing at least five disks;
the first hollow gear case extending from a first end of the cutter bar to a position part way along the cutter bar and containing therein a first gear train formed by a series of intermeshing gears underneath the first plurality of disks and arranged to drive the first plurality of cutter disks;
the second hollow gear case extending from a second end of the cutter bar to said position part way along the cutter bar and containing therein a second gear train formed by a series of intermeshing gears underneath the second plurality of disks and arranged to drive the cutter disks;
the intermeshing pears of the first hollow gear case being separated from the intermeshing gears of the second hollow gear case so that the first gear train drives the first plurality of disks and the second gear train separately drives the second plurality of disks;
one of the cutter disks of the first plurality of cutter disks having a first upstanding drive shaft through which drive is connected to the first gear train;
one of the cutter disks of the second plurality of cutter disks having a second upstanding drive shaft through which drive is connected to the second gear train;
a first gear box connected to an upper end of the first drive shaft;
a second gear box connected to an upper end of the second drive shaft;
a drive transfer shaft connecting the first and second gear boxes;
a conditioner assembly for receiving crop from the cutter disks;
and an input drive for supplying driving rotation to at least the first of the first and second gear boxes;
wherein the second gear box has an output shaft providing an output drive to the conditioner assembly.

6. The header according to claim 5 wherein the input drive provides drive at the first gear box only.

7. The header according to claim 5 wherein the input drive is a hydraulic motor.

8. The header according to claim 5 wherein the first gear box is a right angle drive gear box with bevel gears.

9. The header according to claim 8 wherein the second gear box is a right angle drive gear box with bevel gears.

10. The header according to claim 5 wherein the output shaft is directly driven by the drive transfer shaft and the second drive shaft is at right angles to the transfer shaft and driven by a bevel gear from the drive transfer shaft.

11. The header according to claim 10 wherein the drive transfer shaft is driven at a rate of rotation slower than the first and second drive shafts.

12. A crop harvesting header comprising:
a header frame arranged to be transported across ground on which there is a standing crop for harvesting;
a cutter bar mounted on the header frame across a width of the header for movement across the ground for harvesting the standing crop;
a plurality of generally horizontal cutter disks mounted on the cutter bar at positions spaced transversely of the header with the disks being mounted on the cutter bar for driven rotation about respective generally upright axes spaced along the cutter bar;
each disk having mounted thereon at a position spaced outwardly from the respective axis thereof at least one cutter blade such that rotation of the disk about its axis causes a standing crop to be cut by the blade as it rotates around the axis on the disk;
the cutter bar including a first longitudinally extending hollow gear case underneath a first plurality of the cutter disks and a second longitudinally extending hollow gear case underneath a second plurality of the cutter disks;

each of the first plurality of disks and the second plurality of disks containing at least five disks;

the first hollow gear case extending from a first end of the cutter bar to a position part way along the cutter bar and containing therein a first gear train formed by a series of intermeshing gears underneath the first plurality of disks and arranged to drive the first plurality of cutter disks;

the second hollow gear case extending from a second end of the cutter bar to said position part way along the cutter bar and containing therein a second gear train formed by a series of intermeshing gears underneath the second plurality of disks and arranged to drive the cutter disks;

the intermeshing gears of the first hollow gear case being separated from the intermeshing gears of the second hollow gear case so that the first gear train drives the first plurality of disks and the second gear train separately drives the second plurality of disks;

one of the cutter disks of the first plurality of cutter disks having a first upstanding drive shaft through which drive is connected to the first gear train;

one of the cutter disks of the second plurality of cutter disks having a second upstanding drive shaft through which drive is connected to the second gear train;

a first right angle gear box with bevel gears, one of which is connected to an upper end of the first drive shaft;

a second gear box with bevel gears, one of which is connected to an upper end of the second drive shaft;

a drive transfer shaft connecting the first and second gear boxes;

and an input drive for supplying driving rotation to at least the first of the first and second gear boxes.

13. The header according to claim 12 wherein the input drive provides drive at the first gear box only.

14. The header according to claim 12 wherein the input drive is a hydraulic motor.

15. The header according to claim 12 wherein the drive transfer shaft is driven at a rate of rotation slower than the first and second drive shafts.

* * * * *